(12) United States Patent
Yu

(10) Patent No.: US 6,914,640 B2
(45) Date of Patent: Jul. 5, 2005

(54) TOUCH PANEL LIQUID CRYSTAL DISPLAY DEVICE AND METHOD OF FABRICATING THE SAME

(75) Inventor: Hwan Seong Yu, Kyoungsangbuk-do (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/327,865

(22) Filed: Dec. 26, 2002

(65) Prior Publication Data

US 2003/0122800 A1 Jul. 3, 2003

(30) Foreign Application Priority Data

Dec. 27, 2001 (KR) ..................................... P2001-86113

(51) Int. Cl.[7] ........................ G02F 1/1335; G02F 1/13; G09G 3/36; G09G 5/00
(52) U.S. Cl. ........................... 349/12; 349/187; 349/96; 345/104; 345/173
(58) Field of Search ............................ 349/12, 96, 187, 349/153, 190, 155; 345/104, 173; 428/143

(56) References Cited

U.S. PATENT DOCUMENTS

| | | | | |
|---|---|---|---|---|
| 5,774,107 A | * | 6/1998 | Inou | 345/104 |
| 6,016,134 A | * | 1/2000 | Ota | 345/104 |
| 6,559,595 B1 | * | 5/2003 | Inoue | 313/506 |
| 6,628,268 B1 | * | 9/2003 | Harada et al. | 345/173 |
| 2001/0033913 A1 | * | 10/2001 | Murada et al. | 428/143 |
| 2002/0054261 A1 | * | 5/2002 | Sekiguchi | 349/122 |
| 2002/0109803 A1 | * | 8/2002 | Yu et al. | 349/58 |
| 2002/0130849 A1 | * | 9/2002 | Ahn et al. | 345/173 |
| 2002/0149925 A1 | * | 10/2002 | Epstein et al. | 362/31 |
| 2003/0112227 A1 | * | 6/2003 | Hong | 345/173 |
| 2003/0122797 A1 | * | 7/2003 | Bang et al. | 345/173 |
| 2003/0122799 A1 | * | 7/2003 | Yu | 345/173 |
| 2003/0122801 A1 | * | 7/2003 | Yu | 345/173 |

* cited by examiner

Primary Examiner—Tarifur R. Chowdhury
Assistant Examiner—Mike Qi
(74) Attorney, Agent, or Firm—Morgan Lewis & Bockius LLP

(57) ABSTRACT

A touch panel integrated liquid crystal display device includes a liquid crystal display panel, a touch panel formed on the liquid crystal display panel, a polarizer formed between the liquid crystal display panel and the touch panel, a first adhesive formed between the touch panel and the polarizer, and a second adhesive formed between the polarizer and the liquid crystal display panel, wherein an adhesive strength of the second adhesive is larger than an adhesive strength of the first adhesive.

24 Claims, 3 Drawing Sheets

TOUCH PANEL LIQUID CRYSTAL DISPLAY DEVICE AND METHOD OF FABRICATING THE SAME

The present invention claims the benefit of Korean Patent Application No. P2001-86113 filed in Korea on Dec. 27, 2001, which is hereby incorporated by referenced.

BACKGROUND OF THE INVENTION

1. Field of the Invention

The present invention relates to a touch panel device, and more particularly to a touch panel liquid crystal display device having a polarizer and a touch panel.

2. Description of the Related Art

Touch panels are computer peripheral devices that are commonly installed on display surfaces of image display devices, such as Cathode Ray Tubes (CRTs), Liquid Crystal Displays (LCDs), Field Emission Displays (FEDs), Plasma Display Panel (PDPs), and Electro Luminescence Devices (ELDs). The touch panel is activated by a user applying pressure on the touch panel to enter predetermined information into a computer input terminal.

FIG. 1 is a schematic view of a liquid crystal display device having a touch panel according to the related art. In FIG. 1, a touch panel 32 is mounted onto a liquid crystal display panel 31, and a backlight 33 is provided behind the liquid crystal panel 31. The touch panel 32 is electrically interconnected to a touch controller 34 by a signal line 36, and the touch controller 34 is electrically interconnected to a computer system 35. During operation of the touch panel, if a predetermined pressure is applied to a contact point of the touch panel 32, a voltage value of the contact point is calculated by the touch controller 34 to recognize the coordinates of the contact point.

FIG. 2 is a perspective view of a touch panel of the liquid crystal display device shown in FIG. 1. In FIG. 2, the touch panel 32 includes an upper plate 32a and a lower plate 32b, a liquid crystal display panel 31 that consists of an upper plate 31a and a lower plate 31b, and a polarizer 4 formed between the touch panel 32 and the liquid crystal display panel 31. The touch panel 32 includes an upper electrode formed on an upper substrate of the upper plate 32a, a lower electrode formed on a lower substrate of the lower plate 32b, and a spacer for maintaining gap between the upper plate 32a and the lower plate 32b.

The liquid crystal display panel 31 includes an upper electrode formed on an upper substrate of the upper plate 31a, a plurality of lower electrodes formed on a lower substrate of the lower plate 31b, alignment films (not shown) formed on the upper and lower electrodes, a liquid crystal material formed on the alignment films, and a spacer for controlling a cell gap between the upper plate 31a and the lower plate 31b. In addition, a sealant material that bonds and fixes the upper plate 31a and the lower plate 31b together is formed to prevent moisture and impurities from permeating from an exterior of the liquid crystal display panel 31 to an interior of the liquid crystal display panel 31 along an edge of the upper plate 31a and the lower plate 31b. The polarizer 4 is formed between the lower plate 32b of the touch panel 32 and the upper plate 32a of the liquid crystal display panel 32, wherein the polarizer converts visible light into polarized light.

A first adhesive 39a is formed between the lower plate 32b of the touch panel 32 and the polarizer 4, a second adhesive 39b is formed between the upper plate 31a of the liquid crystal display panel 31 and the polarizer 4. The touch panel 32 is bonded with the liquid crystal display panel 31 by the first adhesive 39a and the second adhesive 39b formed with the polarizer 4 therebetween.

When comparing the first and the second adhesives 39a and 39b, the adhesive strength of the first adhesive 39a is not weaker than that of the second adhesive 39b. Accordingly, when separating the touch panel 32 from the polarizer 4 and the liquid crystal display panel 31 in order to repair the touch panel 32, the polarizer 4 is damaged because the polarizer 4 is separated along with the touch panel 32.

SUMMARY OF THE INVENTION

Accordingly, the present invention is directed to a touch panel liquid crystal display device that substantially obviates one or more of the problems due to limitations and disadvantages of the related art.

An object of the present invention is to provide a touch panel liquid crystal display device that may be divided into a polarizer section and a touch panel section to facilitate repair processes.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a touch panel integrated liquid crystal display device includes a liquid crystal display panel, a touch panel formed on the liquid crystal display panel, a polarizer formed between the liquid crystal display panel and the touch panel, a first adhesive formed between the touch panel and the polarizer, and a second adhesive formed between the polarizer and the liquid crystal display panel, wherein an adhesive strength of the second adhesive is larger than an adhesive strength of the first adhesive.

In another aspect, a method of fabricating a touch panel integrated liquid crystal display device includes steps of forming a touch panel, bonding a first surface of a polarizer on a first surface of the touch panel using a first adhesive, forming a liquid crystal display panel, bonding a first surface of the liquid crystal display panel on a second surface of the polarizer using a second adhesive, wherein an adhesive strength of the second adhesive is larger than an adhesive strength of the first adhesive.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
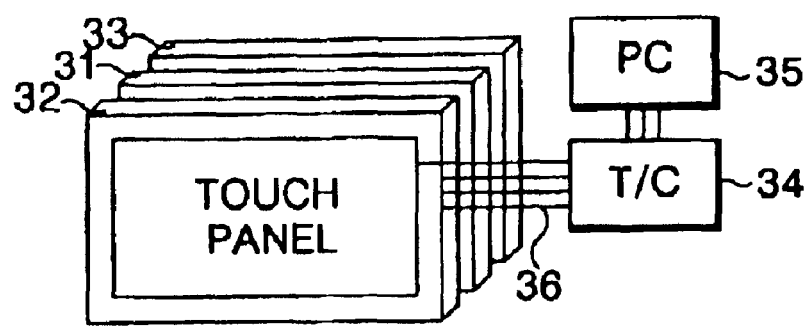
FIG. 1 is a schematic view of a liquid crystal display device having a touch panel according to the related art.
Figure 2:
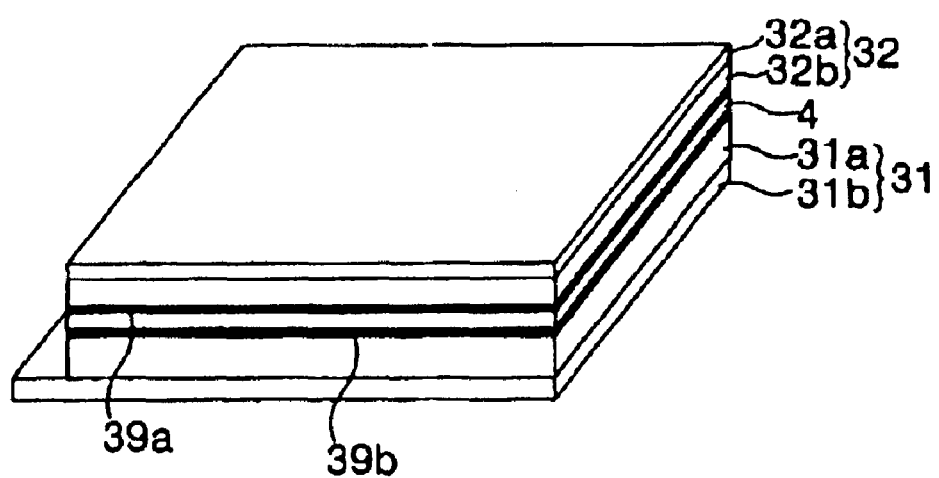
FIG. 2 is a perspective view of a touch panel of the liquid crystal display device shown in FIG. 1.
Figure 3:
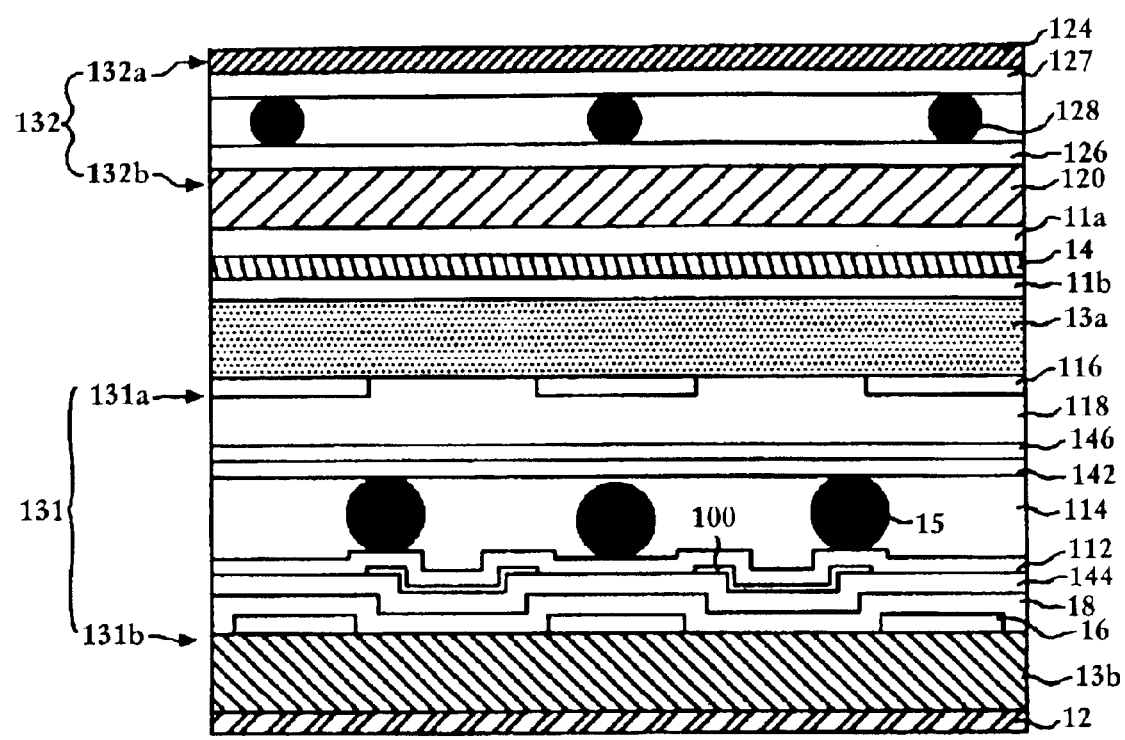
FIG. 3 is a cross sectional view of an exemplary touch panel liquid crystal display device according to the present invention.

FIG. 3 is a cross sectional view of an exemplary touch panel liquid crystal display device according to the present invention. In FIG. 3, the touch panel liquid crystal display device may include a touch panel 132, a liquid crystal display panel 131, and a backlight (not shown). Although not shown, the touch panel 132 may be electrically interconnected to a computer system via a touch controller and signal lines. The touch panel 132 may include an upper plate 132a, a lower plate 132b, and a polarizer 14 may be positioned between the touch panel 132 and the liquid crystal display panel 131 to convert visible light into linear polarized light.

The liquid crystal display panel 131 may include a lower plate 131b, an upper plate 131a formed facing with the lower plate 131b, and a liquid crystal material 114 and a spacer 15 interposed between the upper plate 131a and the lower plate 131b.

The lower plate 131b may include a lower substrate 13b, a thin film transistor (not shown) formed at the intersection of a gate line 16 and a data line (not shown), and a pixel electrode 100 may be electrically interconnected to a drain electrode (not shown) of the thin film transistor. The thin film transistor may include a gate electrode (not shown) electrically connected to the gate line 16, a source electrode (not shown) electrically connected to the data line (not shown), and a drain electrode (not shown) electrically connected to the pixel electrode 100. In addition, the thin film transistor may further include a gate insulation film 118 for electrically insulating the source electrode (not shown) from the drain electrode (not shown), and a semiconductor layer (not shown) for forming a conductive channel between the source and drain electrodes (not shown) by application of a gate voltage supplied to the gate electrode.

A protective film 144 may be formed over the thin film transistor, and the pixel electrode 110 may be formed on the protective film 144 and electrically interconnected to the drain electrode (not shown) via a contact hole (not shown) in the protective film 144. A first alignment film 112 may be formed on the protective film 144 over the lower substrate 13b.

The upper plate 131a may include a upper substrate 13a, a black matrix 116, a color filter 118, a common electrode 146, and a second alignment film 142 sequentially formed on a lower surface of the upper substrate 13a. The black matrix 116 may be formed on the upper substrate 13a in a matrix arrangement to divide the surface of the upper substrate 13a into a plurality of cell areas where the color filters 118 are to be formed and to prevent light interference between adjacent cells.

The color filters 118 may include red, green, and blue tricolors sequentially formed on the upper substrate 13a where the black matrix 116 may be formed. Accordingly, each of the color filters 118 may be formed by spreading a material that absorbs white light and transmits a specific wavelength of light (i.e., red, green, and blue) on the entire surface of the upper substrate 13a where the black matrix 116 is formed. Then, the material may be patterned.

The common electrode 146 may be formed onto the upper substrate 13a where the black matrix 116 and the color filter 118 are formed, and may include a transparent conductive material. A second alignment film 142 may be formed on the upper substrate 13a where the common electrode 146 may be formed, thereby forming the upper plate 131a.

The spacers 15 may be formed on the first alignment film 112 before the upper plate 131a is combined with the lower plate 131b, whereby the upper plate 131a and a lower plate 131b may be separated from each other by a specific gap. Accordingly, the spacers 15 maintain the specific gap between the upper plate 131a and the lower plate 131b, thereby the liquid crystal material layer 114 may have a uniform thickness.

The touch panel 132 may include a lower plate 132b having a first electrode layer 126 formed on the lower substrate 120 formed of polyethylene terephthalate (PET). The touch panel 132 may also include an upper plate 132a having a second electrode 127 formed on the upper substrate 124, and spacers 128 may be formed between the upper plate 132a and the lower plate 132b. The second electrode layer 127 is electrically short circuited with the first electrode layer 126 when a portion of the upper substrate 124 is pressed with a specific pressure by a stylus pen or a finger, for example. Accordingly, a signal is generated having current and voltage levels that are different in accordance with the portion of the upper substrate 124 being pressed. The first and second electrode layers 126 and 127 may include transparent conductive materials. In addition, the first and second electrode layers 126 and 127 may be formed of a double layer structure where silver (Ag) may be printed upon the transparent conductive material. The transparent conductive material may include one of Indium-Tin-Oxide (ITO), Indium-Zinc-Oxide (IZO), and Indium-Tin-Zinc-Oxide (ITZO).

A first adhesive 11a may be formed between the polarizer 14 and the lower plate 132b of the touch panel 132, and a second adhesive 11b may be formed between the polarizer 14 and the upper plate 131a of the liquid crystal display 131. The first adhesive 11a may have a relatively lower adhesive strength than the second adhesive 11b. For example, the adhesive strength of the second adhesive 11b may be about 1 kg/25 mm$^2$ (~0.4N/mm$^2$), and the adhesive strength of the first adhesive 11a may not be more than about 1 kg/25 mm$^2$. Accordingly, since the adhesive strength of the first adhesive 11a is relatively lower than the adhesive strength of the second adhesive 11b, the touch panel 132 can be easily separated from the polarizer 14. In addition, the polarizer 14 may not be damaged during separation.

Figure 4:
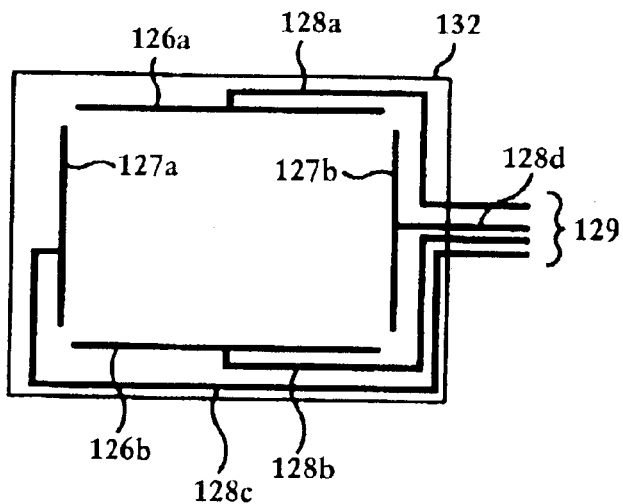
FIG. 4 is a plan view of exemplary electrode and signal line structures formed on the exemplary touch panel liquid crystal display device of FIG. 3.

FIG. 4 is a plan view of exemplary electrode and signal line structures formed on the exemplary touch panel liquid crystal display device of FIG. 3. In FIG. 4, the upper plate 132a (in FIG. 3) of the touch panel 132 includes X-axis electrodes 127a and 127b formed along an edge portion thereof along a vertical direction, and signal lines 128c and 128d may be formed to extend from a center region of the X-axis electrode 127a and 127b for supplying the signal having the current or voltage levels to a touch controller (not shown).

Figure 5:
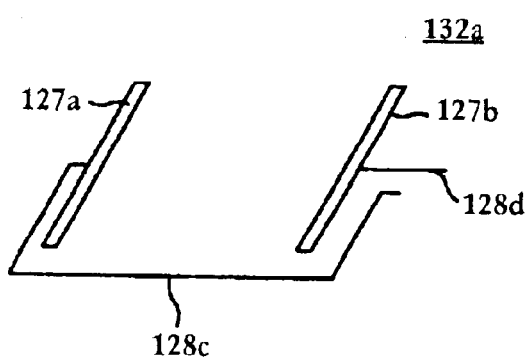
FIG. 5 is a perspective view of exemplary upper and lower plates of the electrode and signal line structures of FIG. 4.
Figure 5:
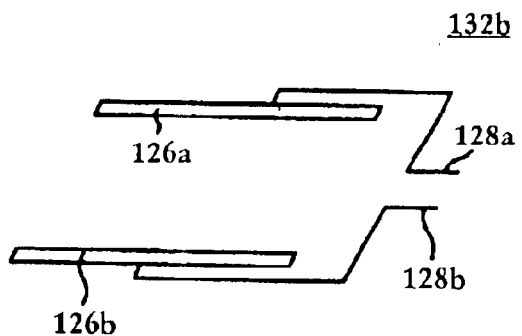

Likewise, as shown in FIG. 5, the lower plate 132b of the touch panel 132 may include Y-axis electrodes 126a and 126b formed along an edge portion thereof along a horizontal direction, and signal lines 128a and 128b may be formed to extend from a center region of the Y-axis electrodes 126a and 126b for supplying the signal having the current or voltage levels to the touch controller (not shown). The signal lines 128a, 128b, 128c, and 128d may include a tail portion 129 (in FIG. 4) and an electrode extension portion connected to the electrodes 126a, 126b, 127a, and 127b. Accordingly, the tail portion 129 of the signal lines 128a, 128b, 128c, and 128d extend to one side of the touch panel 132 for make connection to the touch panel (not shown).

It will be apparent to those skilled in the art that various modifications and variations can be made in the touch panel liquid crystal display device and method of fabricating the same of the present invention without departing from the spirit or scope of the invention. Thus, it is intended that the present invention cover the modifications and variations of this invention provided they come within the scope of the appended claims and their equivalents.

What is claimed is:

1. A touch panel integrated liquid crystal display device, comprising:
    a liquid crystal display panel;
    a touch panel formed on the liquid crystal display panel;
    a polarizer formed between the liquid crystal display panel and the touch panel;
    a first adhesive formed between the touch panel and the polarizer; and
    a second adhesive formed between the polarizer and the liquid crystal display panel,
    wherein an adhesive strength of the second adhesive is larger than an adhesive strength of the first adhesive.

2. The device according to claim 1, wherein the adhesive strength of the second adhesive is about 1 kg/25 mm.

3. The device according to claim 1, wherein the adhesive strength of the first adhesive is not more than about 1 kg/25 mm.

4. The device according to claim 1, wherein the touch panel includes:
    an upper substrate having first and second surfaces;
    a first electrode layer formed on the first surface of the upper substrate;
    a lower substrate having first and second surfaces;
    a second electrode layer formed on the first surface of the lower substrate; and
    a spacer formed between the first surface of the upper substrate and the first surface of the lower substrate.

5. The device according to claim 4, wherein the polarizer is bonded to a second surface of the lower substrate by the first adhesive.

6. The device according to claim 4, wherein the first and second electrode layers include a transparent conductive material.

7. The device according to claim 6, wherein the first and second electrode layers include a silver material formed on the transparent conductive material.

8. The device according to claim 1, wherein the liquid crystal display panel includes:
    an upper plate having first and second surfaces;
    a lower plate having first and second surfaces; and
    a spacer formed between the first surface of the upper plate and the first surface of the lower plate.

9. The device according to claim 8, wherein the polarizer is bonded to the second surface of the upper plate via the second adhesive.

10. The device according to claim 8, wherein the upper plate includes:
    a black matrix formed on the second surface of the upper plate;
    a color filter formed on the second surface of the upper plate and the black matrix;
    a common electrode formed on the color filter; and
    a first alignment film formed to cover the common electrode.

11. The device according to claim 10, wherein the polarizer is formed between the second surface of the upper plate of the liquid crystal display panel and the second surface of the lower plate of the touch panel.

12. The device according to claim 8, wherein the lower plate includes:
    a gate line formed along a first direction on the first surface of the lower plate;
    a data line formed along a second direction perpendicular to the first direction to cross the gate line;
    a thin film transistor formed at an intersection of the gate line and the data line;
    a pixel electrode connected to the thin film transistor; and
    a second alignment film formed to cover the pixel electrode.

13. A method of fabricating a touch panel integrated liquid crystal display device, comprising the steps of:
    forming a touch panel;
    bonding a first surface of a polarizer on a first surface of the touch panel using a first adhesive; and
    forming a liquid crystal display panel;
    bonding a first surface of the liquid crystal display panel on a second surface of the polarizer using a second adhesive,
        wherein an adhesive strength of the second adhesive is larger than an adhesive strength of the first adhesive.

14. The method according to claim 13, wherein the adhesive strength of the second adhesive is about 1 kg/25 mm.

15. The method according to claim 13, wherein the adhesive strength of the first adhesive is not more than about 1 kg/25 mm.

16. The method according to claim 13, wherein the step of forming a touch panel includes steps of:
    forming a first electrode layer on a first surface of an upper substrate;
    forming a second electrode layer on a first surface of a lower substrate; and
    forming a spacer between the first surface of the upper substrate and the first surface of the lower substrate.

17. The method according to claim 16, wherein the first and second electrode layers include a transparent conductive material.

18. The method according to claim 17, wherein the first and second electrode layers include a silver material formed on the transparent conductive material.

19. The method according to claim 16, wherein the step of bonding a first surface of a polarizer includes bonding a second surface of the lower substrate by the first adhesive.

20. The method according to claim 13, wherein the step of forming a liquid crystal display panel includes forming a spacer between a first surface of an upper plate and a first surface of a lower plate.

21. The method according to claim 20, wherein the step of bonding a first surface of the liquid crystal display panel includes bonding the second surface of the polarizer to a second surface of the upper plate via the second adhesive.

22. The method according to claim 20, wherein the upper plate includes:
- a black matrix formed on the second surface of the upper plate;
- a color filter formed on the second surface of the upper plate and the black matrix;
- a common electrode formed on the color filter; and
- a first alignment film formed to cover the common electrode.

23. The method according to claim 20, wherein the lower plate includes:
- a gate line formed along a first direction on the first surface of the lower plate;
- a data line formed along a second direction perpendicular to the first direction to cross the gate line;
- a thin film transistor formed at an intersection of the gate line and the data line;
- a pixel electrode connected to the thin film transistor; and
- a second alignment film formed to cover the pixel electrode.

24. The method according to claim 20, wherein the polarizer is formed between the second surface of the upper plate of the liquid crystal display panel and the second surface of the lower plate of the touch panel.

* * * * *